United States Patent [19]

Altenschulte et al.

[11] 4,079,636
[45] Mar. 21, 1978

[54] CAM SETTING MEANS FOR A CAM ASSEMBLY

[75] Inventors: Raymond A. Altenschulte, Indianapolis; Daniel I. Poore, Beech Grove, both of Ind.

[73] Assignee: P. R. Mallory & Co. Inc., Indianapolis, Ind.

[21] Appl. No.: 748,561

[22] Filed: Dec. 8, 1976

[51] Int. Cl.² .................. F16H 53/00; H01H 7/08
[52] U.S. Cl. .................. 74/568 T; 200/27 B; 200/38 FA; 200/38 FB; 200/38 BA
[58] Field of Search ............... 74/553, 568 T, 568 R, 74/568 M, 567, 116; 200/38 BA, 38 A, 38 FB, 38 F, 38 DC, 38 R, 27 B, 38 FA

[56] References Cited

U.S. PATENT DOCUMENTS

| 2,341,774 | 2/1944 | Harris | 74/567 X |
| 2,382,849 | 8/1945 | Bennett et al. | 74/568 |
| 2,536,256 | 1/1951 | Berg | 200/38 A X |
| 2,624,812 | 1/1953 | Shaw et al. | 200/38 BA |
| 2,642,503 | 6/1953 | Dietrich | 74/568 X |
| 2,800,808 | 7/1957 | Cappelle et al. | 74/568 X |
| 3,011,039 | 11/1961 | Siri | 74/553 X |
| 3,541,981 | 11/1970 | Watson | 74/568 X |
| 3,558,835 | 1/1971 | Cuchla | 200/38 F |
| 3,561,287 | 2/1971 | Lawrence, Jr. | 74/553 |

FOREIGN PATENT DOCUMENTS

| 1,208,725 | 10/1970 | United Kingdom | 74/553 |

Primary Examiner—Samuel Scott
Assistant Examiner—Don E. Ferrell
Attorney, Agent, or Firm—Hoffmann, Meyer & Coles

[57] ABSTRACT

A washer is adjustably connected to a driving member of a cam assembly and is coupled to a cam means of the cam assembly.

3 Claims, 1 Drawing Figure

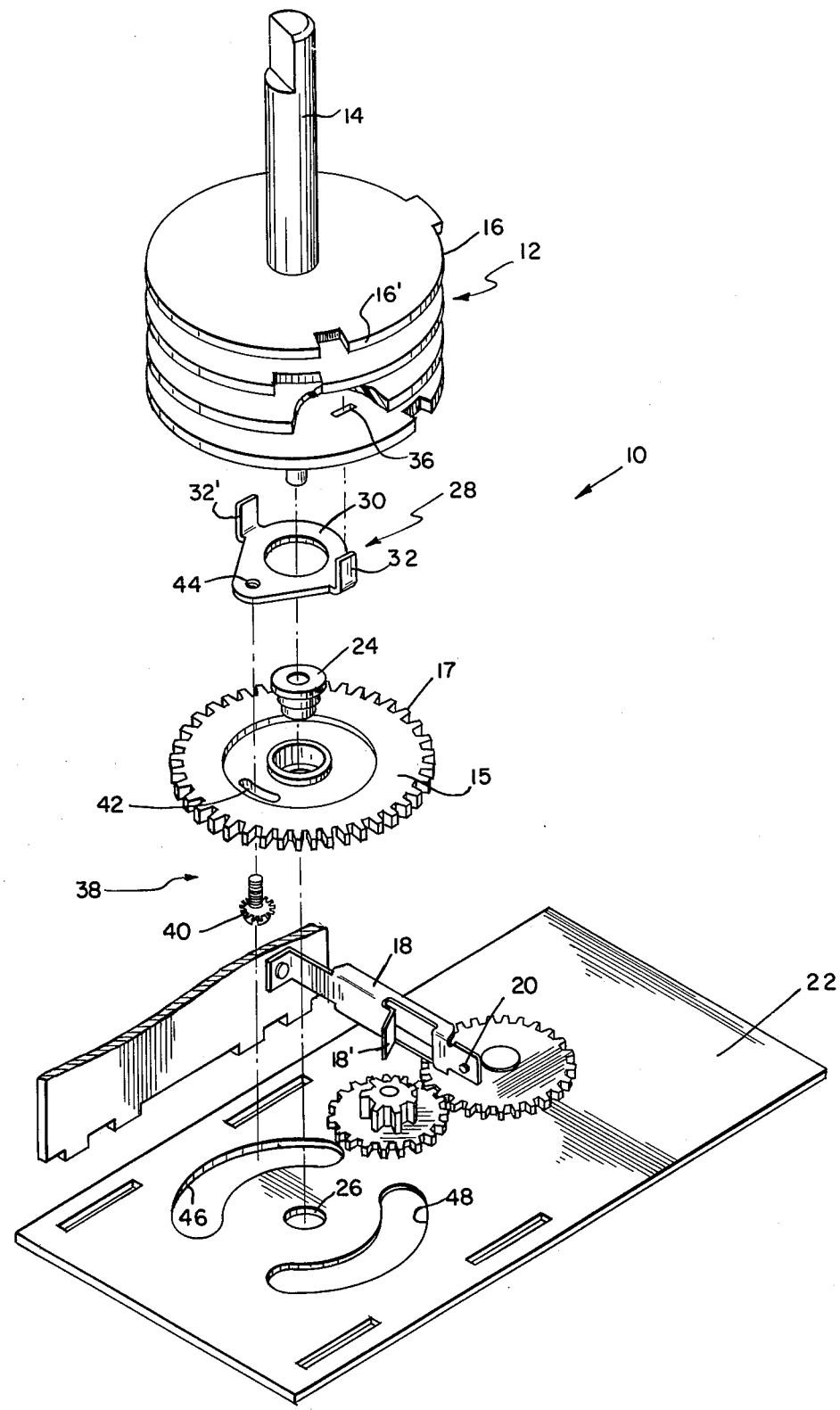

CAM SETTING MEANS FOR A CAM ASSEMBLY

Generally speaking, the present invention pertains to a cam setting means for a cam assembly wherein a cam means and a driving member driving the cam means are disposed in spaced relation, the cam setting means including a washer disposed between the cam means and the driving member, coupling means coupling the washer to the cam means, and an adjustable fastening means connecting the washer to the driving member.

The present invention relates to cam assemblies and more particularly to a means of setting the circumferential setting of a cam means of the cam assembly.

Timing mechanisms are widely used in appliances such as dishwashers, washers and dryers, etc to provide sequential operation of the functional elements of the appliance. Such timing mechanisms usually include a cam assembly consisting essentially of a cam means carried on a shaft and a driving member to impart rotation of the cam means, the driving member being driven by a motor. As is well known in the art, rotation of the cam means opens and closes electrical switches in accordance with the program of the cam means.

It can be appreciated that accurate circumferential positioning of the cam means in relation to the switches being open and closed is of the utmost importance. More specifically, it is important that the lobes of the cam be circumferentially accurate so that the lobes engage the switches at the proper time.

It has been found that "slack" sometimes develops between the cam lobes and the switches such that the lobes do not actuate the switches at the proper time. Such slack can develop during assembly of the timing mechanism or through wear and other misalignments caused by excessive use.

The present invention is concerned with a cam assembly and has as one of its features the provision of a means to circumferentially set the cam means of the assembly. Another feature of the invention is the provision of a cam assembly having a cam means spaced from a driving member and a cam setting means disposed between and connected to the two. Yet another feature of the invention is the provision of such a cam setting means which includes a washer having coupling means coupling the washer to the cam means and adjustable fastening means connecting the washer to the driving member.

These and other features of the invention will become apparent from the followng description taken in conjunction with the accompanying drawings wherein the sole FIGURE is an exploded view of a cam assembly incorporating the cam setting means of the invention.

Referring to the drawing cam assembly 10, in general, includes a cam means 12 rotatably carried on a shaft 14 and a driving member 15 rotatably carried on the shaft and spaced from the cam means. In the embodiment shown, cam means 12 includes a plurality of cams 16 having individual cam surfaces 16' which engages a plurality of movable switch arms 18 (only one shown) through cam followers 18'. As is well known in the timer art, the movable switch arms carry an electrical contact 20 which engages a corresponding stationary electrical contact (not shown) thereby closing an electrical switch.

As shown, driving member 15 includes a gear 17 which, as well known in the art, is coupled to a motor (not shown) through a gear train (not shown).

The whole cam assembly is carried on base plate 22 by shaft 14 being carried on the base plate through spacer 24 which is fixedly carried in aperture 26.

Driving member 15 is coupled to cam means 12 through a cam setting means 28. Cam setting means 28 includes a washer 30 which is disposed between the cam means and the driving member. The washer is coupled to the cam means through a pair of tabs 32 and 32' which extend from the outer periphery of the washer and engage a pair of corresponding slots 36 provided in the cam means. The washer is connected to the driving member by an adjustable fastening means 38 which includes a set screw 40 which engages a face of the driving member and extends through an arcuate slot 42 to engage threaded aperture 44 of the washer. Access to the set screw can be gained through either of arcuate slots 46 or 48 provided in base plate 22.

When it is desired to set the cam means, set screw 40 is loosened and rotated in arcuate slot 42 to rotate the cam means to thus set the cam means.

What is claimed is:

1. In a cam assembly which includes a cam means and a driving member driving said cam means spaced from one another, a cam setting means comprising:
   a. a washer disposed between said cam means and said driving member,
   b. coupling means coupling said washer to said cam means, and
   c. adjustable fastening means connecting said washer to said driving member.

2. In a cam assembly according to claim 1 wherein said coupling means comprises at least one tab extending from said washer and engaging an aperture in said cam means.

3. In a cam assembly according to claim 1 wherein said adjustable fastening means comprises a set screw extending through a slot in said driving member and engaging said washer.

* * * * *